US009014694B2

(12) United States Patent
Tiirola et al.

(10) Patent No.: US 9,014,694 B2
(45) Date of Patent: Apr. 21, 2015

(54) NON-ORTHOGONAL TRANSMIT MODE (75) Inventors: Esa T. Tiirola, Kempele (FI); Kari P. Pajukoski, Oulu (FI); Olav E. Tirkkonen, Helsinki (FI)

(73) Assignee: Nokia Solutions and Netowrks Oy, Espoo (FI)

( * ) Notice: Subject to any disclaimer, the term of this patent is extended or adjusted under 35 U.S.C. 154(b) by 299 days.

(21) Appl. No.: 13/360,902

(22) Filed: Jan. 30, 2012

(65) Prior Publication Data

US 2013/0196700 A1  Aug. 1, 2013

(51) Int. Cl.
*H04W 4/00* (2009.01)
*H04J 11/00* (2006.01)

(52) U.S. Cl.
CPC ........... *H04J 11/004* (2013.01); *H04J 11/0043* (2013.01)

(58) Field of Classification Search
CPC .................................................... H04W 48/08
USPC ............................ 455/63.1, 452.1, 443, 432.1
See application file for complete search history.

(56) References Cited

U.S. PATENT DOCUMENTS

2010/0190447 A1*  7/2010  Agrawal et al. .............. 455/63.1
2013/0003569 A1*  1/2013  Lindoff et al. ................. 370/252

OTHER PUBLICATIONS

Shun Tomida et al: "Non-orthogonal access with SIC in cellular downlink for use fairness enhancement" Intelligent Signal Processing and Communications Systems (ISPACS), 2011 International Symposium on, IEEE, Dec. 7, 2011, pp. 1-6, XP032114760, DOI: 10.1109/ISPACS.2011.6146188, ISBN: 978-1-4577-2165-6 the whole document.
Rinne M et al: "A Performance Summary of the Evolved 3G (E-UTRA) for Voice Over Internet and Best Effort Traffic", IEEE Transactions on Vehicular Technology, IEEE Service Center, Piscataway, NJ, US, vol. 58, No. 7, Sep. 1, 2009, pp. 3661-3673, XP011267387, ISSN: 0018-9545, DOI: 10.1109/TVT.2009.2014457, the whole document.

* cited by examiner

*Primary Examiner* — Tu X Nguyen
(74) *Attorney, Agent, or Firm* — Harrington & Smith (57) ABSTRACT

A first user equipment UE operating in a first/strong transmission mode determines that a second UE is operating in a second/weak mode and is allocated a same radio resource as the first UE. The first UE determines a transport format for transmissions to the second UE and uses that to decode and cancel a transmission received on the radio resource which is directed to the second UE, mitigating interference with a further transmission directed to the first UE. Various examples are given of specific resource allocation signaling used to determine that the second UE is operating in the second mode and is allocated the same radio resource, such as implicitly by a specific downlink control indication format or an explicit indication in a resource allocation directed to the first UE. The first UE can determine the transport format of the second UE from network signaling.

18 Claims, 4 Drawing Sheets

NON-ORTHOGONAL TRANSMIT MODE

TECHNICAL FIELD

The exemplary and non-limiting embodiments of this invention relate generally to wireless communication systems, methods, devices and computer programs, and more specifically relate to canceling interfering signals that are wirelessly received at one radio device but intended for another radio device.

BACKGROUND

Figure 1:
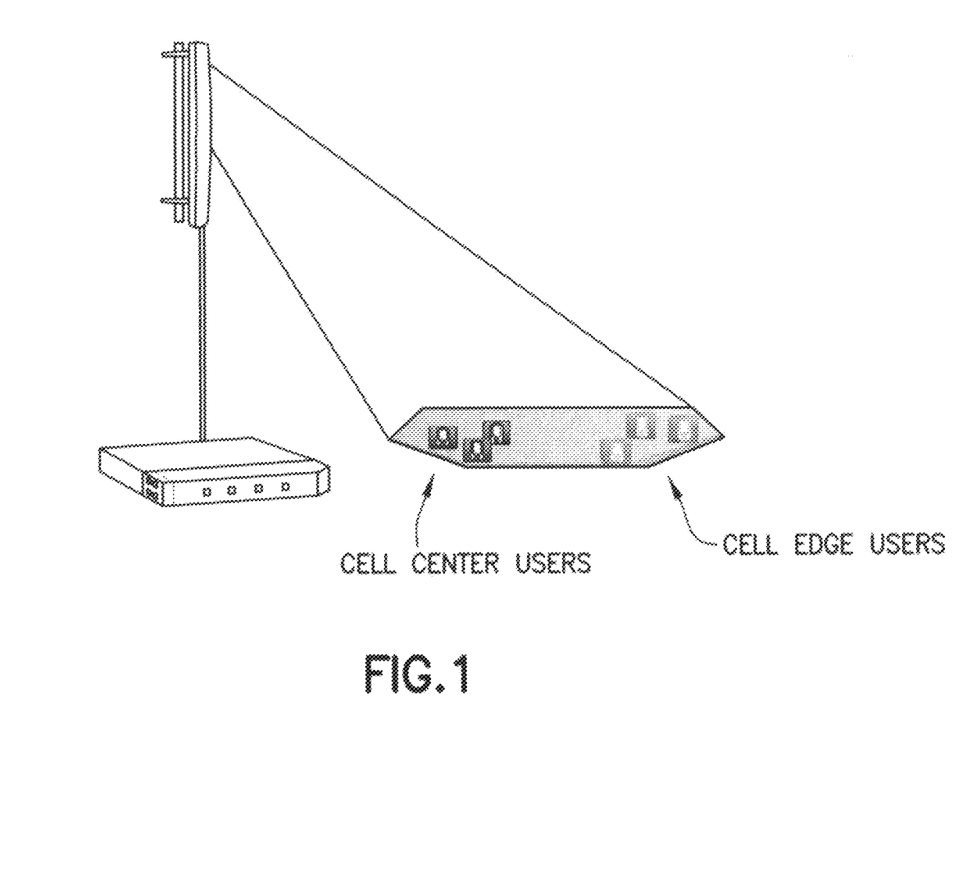
FIG. 1 is a schematic overview of a radio environment suitable for non-orthogonal access, in which stronger cell center users are allocated the same resources as weaker cell edge users, and is a radio environment in which embodiments of these teachings can be practices to advantage.

The following abbreviations that may be found in the specification and/or the drawing figures are defined as follows:

3GPP third generation partnership project
ACK/NACK acknowledgement/negative acknowledgement
CQI channel quality indicator
CDMA code division multiple access
CSI channel state information
DCI downlink control information
DL downlink (eNB towards UE)
eNB EUTRAN Node B (evolved Node B)
EUTRAN evolved UTRAN (LTE)
FEC forward error coding
IC interference cancellation
LTE/LTE-A long term evolution/long term evolution-advanced
MCS modulation and coding scheme
MIMO multiple input multiple output
MU-MIMO multi-user MIMO
PDCCH physical downlink control channel
PDSCH physical downlink shared channel
QAM quadrature amplitude modulation
QPSK quadrature phase shift keying
RRC radio resource control
RV redundancy version
RX receive or receiver
SINR signal to interference plus noise ratio
TB transport block
TBS transport block size
SU-MIMO single user multiple input multiple output
TX transmit
UE user equipment
UL uplink (UE towards eNB)
UTRAN universal terrestrial radio access network Non-orthogonal access schemes are being considered for radio access technologies known currently as "beyond 4G1", or B4G, which is targeted for commercial deployment in 2020. Such access schemes may also be deployed in more near-term evolutions/releases of the LTE/LTE-A radio access technologies. Non-orthogonal access is considered as a potential multiple access scheme to significantly increase the downlink capacity that can be offered to cell edge users. There are several ways to realize improved capacity from non-orthogonal access techniques depending on the scheduler algorithms used by the eNB. FIG. 1 illustrates the general principle which is based on path loss separation of users nearer the center of the cell which are considered to be the users with stronger signal strength, and users nearer the edge of the cell which are considered to be the users with weaker signal strength. This is a simplification in that signal strength is not always directly related to distance from the transmitting entity, but for purposes of explanation nothing is lost from this simplified radio environment.

FIG. 1 is an exemplary radio environment in which an access node, such as for example an eNB of an LTE-A system, transmits to user equipments/mobile terminals grouped for the sake of explanation into cell center users and cell edge users. For non-orthogonal access, the eNB will allocate more resources to cell edge users, at the expense of resources available for the cell center users. In an extreme case the eNB may give all its resources to the weakest user at the cell edge.

The principle of non-orthogonal access is known in the art. For example, non-orthogonal access can be realizes by superposition coding (for example, with non-orthogonal CDMA scrambling/spreading), by hierarchical modulation which uses layered modulation of base and enhancement layer symbols, by multilevel coding which uses several error correcting codes with different capabilities, and/or by dirty paper coding which introduces precoding to cancel the effect of interference known to the transmitter.

As a specific example to illustrate the radio environment, consider that a weakest cell edge user and a strongest cell center user both get transmissions from the eNB. Assume the eNB transmits with QPSK modulation to that weakest user with transmit power $S_w$, and that the eNB transmits to the strongest user with superposed QPSK/QAM modulation and transmit power $S_s$. From the perspective of the weakest user, power $S_s$ is seen as additional interference to it. But the weak user's reception condition does not suffer much if $S_s/S_w$ is less than $SINR_w$. In non-orthogonal access the weakest (cell edge) user additionally benefits from additional resources as compared to the strongest (cell center) user. From the perspective of the strongest user, it also receives the eNB's transmission which is intended for the weakest user. Because the strongest user receives that transmission with good SINR it can easily decode and cancel that signal intended for the weakest user, and so this interference to the strongest user is manageable.

But non-orthogonal access requires the possibility for the eNB to allocate the same resource to multiple users. A similar same-resource scenario exists in the downlink for LTE systems where multi-user MIMO is in use. However, there is no support in LTE for a UE which is capable of intra-cell interference cancellation (IC), which is the scenario above where the strongest user decodes and cancels the signal intended for the weakest user.

What is needed in the art is a way to facilitate in practice intra-cell IC which is currently not supported by LTE radio systems. For a more practical application such improvement should also enable non-orthogonal access to be implemented in a cell where legacy UEs which do not support intra-cell IC might also be operating.

SUMMARY

In a first exemplary aspect of the invention there is a method which comprises: determining that there is a second user equipment operating in a second transmission mode and is allocated a same radio resource as a first user equipment operating in a first transmission mode; determining a transport format for transmissions to the second user equipment; using the determined transport format to decode a transmission received on the radio resource at the first user equipment which is directed to the second user equipment; and canceling the decoded transmission to mitigate interference with a further transmission directed to the first user equipment.

In a second exemplary aspect of the invention there is an apparatus which includes at least one processor and at least one memory including computer program code. The at least one memory and the computer program code are configured to, with the at least one processor and in response to execution of the computer program code, cause the apparatus at least to: determine that there is a second user equipment operating in a second transmission mode and is allocated a same radio resource as a first user equipment operating in a first transmission mode; determine a transport format for transmissions to the second user equipment; use the determined transport format to decode a transmission received on the radio resource at the first user equipment which is directed to the second user equipment and cancel the decoded transmission to mitigate interference with a further transmission directed to the first user equipment.

In a third exemplary aspect of the invention there is a computer readable memory tangibly storing a program of instructions comprising: code for determining that there is a second user equipment operating in a second transmission mode and is allocated a same radio resource as a first user equipment operating in a first transmission mode; code for determining a transport format for transmissions to the second user equipment; code for using the determined transport format to decode a transmission received on the radio resource at the first user equipment which is directed to the second user equipment; and code for canceling the decoded transmission to mitigate interference with a further transmission directed to the first user equipment.

DETAILED DESCRIPTION

While the description and examples below are in the context of adapting the LTE system for these teachings, this is a non-limiting radio access technology and so the names for network nodes, channels, resources and the like are not limiting to the broader teachings herein.

In the LTE system the eNB allocates resources to individual UEs via the PDCCH, and the resources that are allocated are a PDSCH in the case the allocated resources are downlink which is the relevant direction for interference cancellation by the UE according to these examples. The downlink data channel may carry different names in other radio access technologies. Furthermore, although the example has been given using PDSCH as the channel type, the principle is applicable to any channel/channel type including also control channels and reference signals.

According to an exemplary embodiment of these teachings there are two modes of operation for a UE respecting the downlink shared channel PDSCH. There is a weak user mode and a strong user mode, and at least all UEs which are in an RRC connected state with the cell/eNB will be operating in one or the other. The weak user mode is configured for those users that sometimes may be allocated, at least on part of the allocated resources, as the most robust transmission that some other users should decode and cancel. In the background section this greater robustness is reflected in the higher transmit power $S_w$ as compared to $S_s$. The strong user mode is configured for those users that sometimes may be required to cancel some other user's interference in order to properly receive (decode) its own downlink data.

In more specific embodiments the strong UE mode can be characterized by the following attributes:
  It is applicable to a predefined UE category only, such as a UE which supports intra-cell IC. A UE capable of operating in the strong user mode is also capable of operating in the weak user mode.
  In the strong user mode there is a specific resource allocation signaling which enables intra-cell IC at the receiver end. Strong users need to know the transport format of the transmission directed to the weak user(s) in order to properly cancel those other transmissions. Below are detailed various embodiments of such specific resource allocation signaling.

In these more specific embodiments the weak UE mode can be characterized in that it is transparent to the UE. That is, there is no special processing or signaling the weak mode UE must conduct to be a weak mode UE, and so legacy UEs which are not capable of operating in the strong mode can co-exist in the weak mode with strong mode UEs in the same cell. In one implementation:
  The weak user mode is the default mode of operation; it is applied in the case a UE camps in the network and is not yet in an RRC connected state with the cell/eNB.
  Legacy UEs which are not capable of strong mode operation can be paired with strong users to operate in this weak user mode. In this manner, cell edge improvements provided by non-orthogonal access system can extend to legacy UEs which are not even capable of strong mode operation.

The various UEs in the cell can be configured for the strong mode or for the weak mode explicitly via higher layer signaling (such as for example RRC signaling). As noted above, absent such UE-specific configuration the default mode is the weak mode so that legacy UEs not capable of strong mode operation can co-exist in a same non-orthogonal access cell with strong mode UEs. In another embodiment the eNB may dynamically change the strong or weak mode configuration for a given UE on a subframe by subframe basis.

The strong mode user needs to know the transport format of the transmission to the weak user(s) in order to decode and cancel those transmissions directed toward the weak user that the strong user also receives. To enable this the eNB can convey to the strong mode user one or more of following attributes of the weak mode user.

In one embodiment the eNB conveys information related to presence of (at least one) weak user on (at least) part of the resources which are allocated to the strong mode user. This information is used by the strong mode user for the decision block 204 at FIG. 2, and the eNB may convey this information implicitly or explicitly. As one non-limiting example of such implicit signaling, the eNB may inform the strong mode UE of the C-RNTI(s) that is/are assigned to the weak mode UE(s), which allows the strong mode UE to decode the DL resource allocation grants (PDCCHs in LTE) corresponding to the weak mode UE(s). Another example of such an implicit indication to the strong mode UE is to use a specific DCI format (corresponding to a specific length of the PDCCH in LTE) to indicate the presence of a weak mode user; the strong mode user sees that dedicated DCI and derives from it that there is a weak mode user present. The strong UE may be capable of decoding both DCI corresponding to "weak UE mode" and DCI corresponding to "strong UE mode". The presence of a weak mode UE may in this scenario depend on the type of DCI received by the strong mode UE.

As one non-limiting example of explicit signaling, the eNB signals that a weak mode user is present within the DCI that is directed to the strong mode user. This information can be conveyed also in the form of specific indicator bit(s) in the DCI format. The presence of such a weak mode user then forces the strong mode user to cancel from its received signaling that portion which is directed to the weak mode user.

Another attribute of the weak mode user that the eNB can convey to the strong mode user is a transport format which corresponds to the weak mode user; that is, the transport format that the eNB uses for its transmissions (on the PDSCH) directed to the weak mode user. The strong mode UE will need the transport format of the weak mode UE to cancel interference from transmissions directed to the weak mode UE. The strong mode UE may be capable of decoding both DCI corresponding to the 'weak UE mode' and DCI corresponding to the 'strong UE mode'. The presence of a weak mode UE may in this scenario depend on the type of DCI received by the strong mode UE. Non-limiting examples of such parameters/attributes which allow the strong mode UE to know the transport format of the weak mode UE for interference cancellation purposes include a certain modulation constellation, a certain forward error coding (FEC) technique such as a particular modulation and coding scheme (MCS), and/or a particular redundancy version and/or new data indicator of the hybrid automatic-repeat request HARQ information. For the case that MIMO is in use in the cell with channel state information CSI feedback, there may be precoders the eNB uses in its transmissions to the weak mode user that are dedicated for the transport format of weak mode users. Any of the above may be signaled to the strong mode user to inform it what is the dedicated transport format for the weak mode user, it may be signaled generally in the cell such as in system information or in the master information block, or it may be static and published in a wireless standard so the eNB and the strong mode users know in advance what is the transport format dedicated for weak mode users.

Additional options for the transport format attribute include dedicated pilots used for the eNB's transmissions to the weak mode users which the eNB may indirectly signal to the strong mode user, and there may be a precoding matrix indicator (PMI) dedicated for the weak mode users which the eNB may directly signal to the paired strong mode user.

Figure 2:
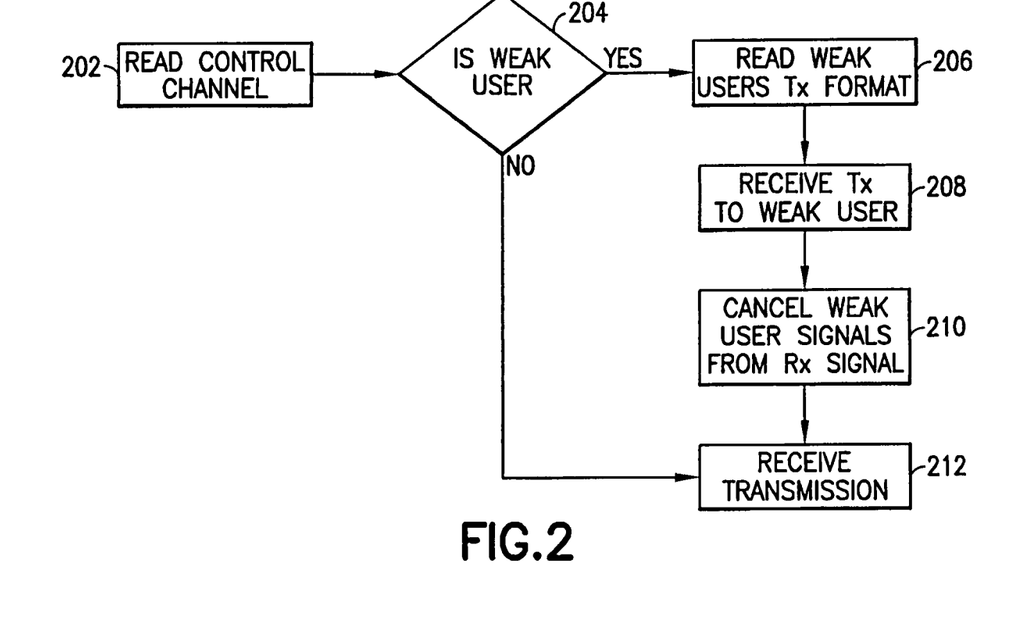
FIG. 2 is an exemplary flow chart describing decisions and actions taken by a strong cell center user according to an exemplary embodiment of these teachings.

FIG. 2 is a process flow diagram illustrating interference cancellation by the weak mode user according to one non-limiting embodiment of these teachings. At block 202 the strong mode UE reads the control channel, which in the LTE examples above is the PDCCH having a certain DCI format. According to any of the various examples above, from the control channel the strong mode UE decides at block 204 if there is a weak user present. Present in this context means allocated at least some of the same resources as the strong mode user, since interference cancellation is not needed if they allocated different PDSCHs. If they are allocated different PDSCH resources the eNB will not use the special downlink signaling that the strong mode user read at 202 which indicates a weak mode user is present. If there is no weak mode user present the decision block 204 leads to block 212 and the strong mode UE receives its transmission (PDSCH) and decodes it normally, without engaging in the intra-cell interference cancellation according to these teachings.

If a weak mode user is present the decision block 202 leads to block 206 where the strong mode user reads the weak mode user's transmission format. Above are various examples of how the strong mode user can know what transmission format the eNB is using for the weak mode user on that/those same PDSCH resource(s). At block 208 the strong mode user receives the transmission, on the PDSCH that is allocated to both the strong mode and the weak mode user and which uses the weak mode transmission format, and at block 210 the strong mode user cancels from the signal it receives on that commonly allocated PDSCH that transmission directed to the weak mode user. This intra-cell interference cancellation allows the strong mode user to receive at block 212 only the portion of that transmission from the eNB on the commonly allocated PDSCH that is directed to itself, the strong mode user.

One technical effect of these exemplary embodiments is that they provide a framework for non-orthogonal access which can be used on top of LTE-Advanced, and so need not wait for beyond 4G for implementation. Another technical effect is that they allow the legacy UEs which need not even be compatible with the strong mode interference cancellation detailed herein to experience improvements in cell edge operation afforded by non-orthogonal access systems.

Figure 3:
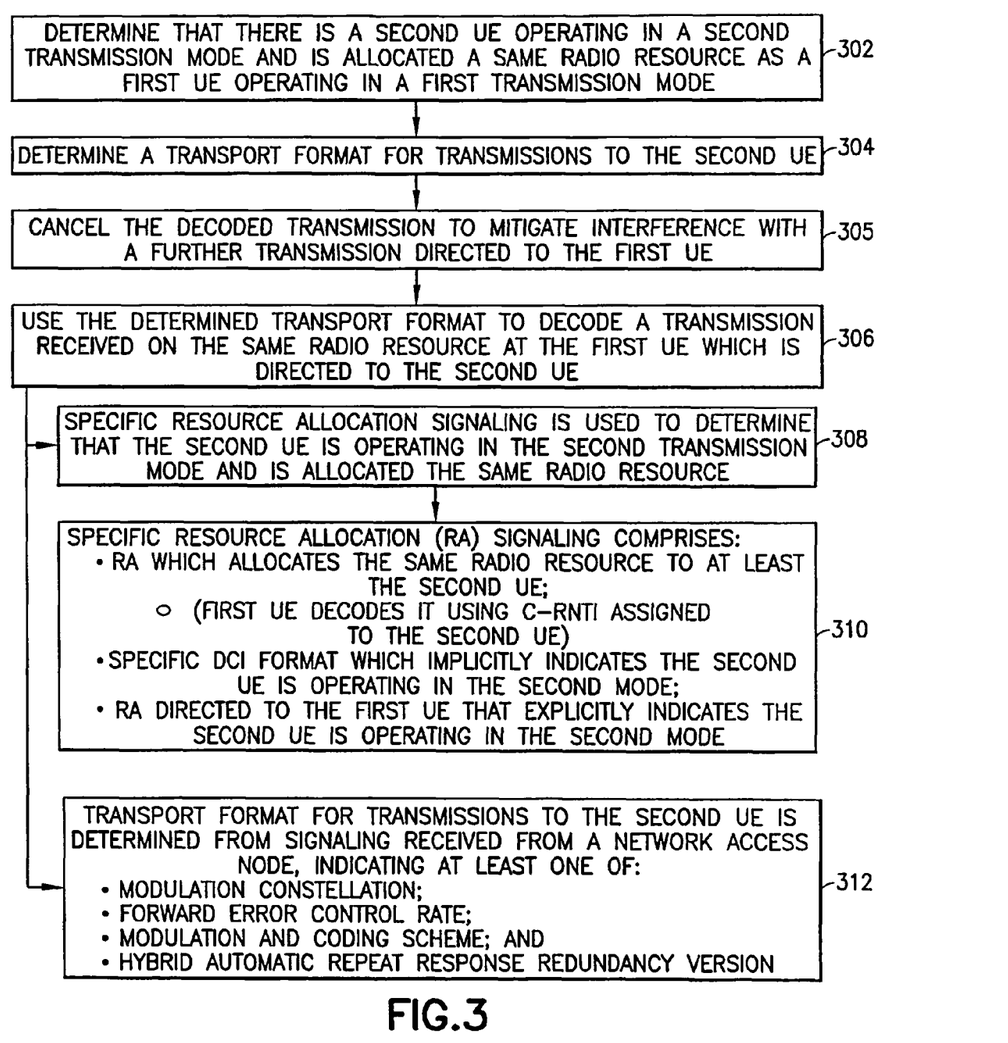
FIG. 3 is a logic flow diagram that illustrates the operation of a method, and a result of execution of computer program instructions embodied on a computer readable memory, in accordance with the exemplary embodiments of this invention.

FIG. 3 is a more detailed logic flow diagram that illustrates the operation of a method, an apparatus such as the strong mode UE or one or more components thereof. FIG. 3 also illustrates a result of execution of computer program instructions stored on a computer readable memory, in accordance with the exemplary embodiments of this invention. FIG. 3 recites in a bit more generic language than the description of FIG. 2. For FIG. 3, the first UE is in the position of the strong mode user in the above examples, the second UE is in the position of the weak mode user, the first transmission mode corresponds to the strong mode in the above examples, and the second transmission mode corresponds to the weak mode.

Block 302 of FIG. 3 details that the UE (or components therefore) performing FIG. 3 determines that there is a second UE operating in a second transmission mode and that second UE is allocated a same downlink resource as a first UE operating in a first transmission mode. In some implementations the same resource may be allocated by a same DCI (Downlink Control Information) transmitted on PDCCH (since one DCI can give radio resource allocations for multiple UEs), and in other implementations the first and second UEs can get the same PDSCH allocated in different DCIs transmitted on PDCCH. As noted above, the channel names and specific LTE examples are non-limiting to the broader aspects of these teachings and so the PDCCH is only one example of a control channel carrying DCI that grants radio resources. Release 11 of LTE is expected to include a e-PDCCH for carrying DCI and in that environment one UE may get its allocation via a PDCCH and the other may get its allocation via an e-PDCCH, or both weak and strong mode UEs may get theirs via the e-PDCCH without departing from these teachings.

Block 304 provides that the UE or components therefore executing the FIG. 3 process determines a transport format for transmissions (PDSCH transmissions in an LTE-type system) to the second user equipment. These transmissions will be on that same radio resource/PDSCH noted at block 302. And at block 306 the UE performing FIG. 3 (the first UE or components therefore) then uses the determined transport format to decode a transmission that it receives but which is directed to the second UE, and at block 305 cancel the decoded transmission to mitigate interference with a further transmission directed to the first user equipment. Such a further transmission is in the above non-limiting examples the scheduled downlink data directed to/intended for the first UE. The first UE's data is a 'further transmission' since, although on a same PDSCH as the data intended for the second UE, it has a different transport format and may be coded/masked with an identifier of the first UE and so is objectively distinguishable.

Further portions of FIG. 3 summarize various of the non-limiting embodiments which are detailed above with greater particularity, and may be employed individually or in any of various combinations alongside blocks 302, 304 and 306 in this example. Block 308 specifies that it is specific resource allocation signaling which is used to determine (as in block 302) that the second UE is operating in the second transmission mode and is allocated the same radio resource as the first UE.

Block 310 provides various implementation options for block 306. In one implementation that specific resource allocation signaling comprises a resource allocation (PDCCH) which allocates the same radio resource (PDSCH) to at least the second UE. As detailed above, the first UE decodes that specific resource allocation using a cell radio network temporary identifier (C-RNTI) assigned to the second UE. In another implementation the specific resource allocation signaling is characterized by a specific downlink control indication (DCI) format which implicitly indicates the second UE is operating in the second mode (and has been allocated the same DL radio resources). And in a third implementation option the specific resource allocation signaling comprises a resource allocation directed to the first UE that includes an explicit indication that the second UE is operating in the second mode. As noted above, the same PDSCH resource(s) may be allocated to the first and the second UEs by a same DCI on PDCCH or by different DCIs on PDCCHs.

Block 312 provides example implementation details for block 304. In these examples, the first UE or components therefore determines the transport format by checking its local memory to know which transport format is being used for the second mode. As noted above, this information might be hard coded in the UE's memory if it is published in a radio access technology standard, or it may be put in memory from signaling by the eNB (system information or master information block, or dedicated semi-static or dynamic signaling to name a few non-limiting examples). The strong mode user can then use its knowledge of the transport format for the weak mode user to read the DCI targeted to the second UE and then decode and cancel those transmissions directed to the weak mode user, and thereby mitigate the interference the strong mode user sees from it. While in some embodiments the transport format for the weak mode users may be hard coded in the strong mode users memory (i.e., published in a wireless standard), block 312 specifies that the first UE determines the transport format for transmissions to the second user equipment from signaling received from a network access node. As in the examples above the signaling to indicate to the strong mode UE the transport format of the weak-mode UE may indicate one or more of: modulation constellation; forward error coding; modulation and coding scheme; hybrid automatic repeat response redundancy version and new data indicator.

For completeness, above was also detailed that the first UE or components therefore may also receive an indication of at least one precoder used in the transmissions that are directed to the second user equipment. In this case the first UE uses that at least one precoder to aid in decoding the transmissions received at the first UE (those decoded transmissions are then canceled from the first UE's received signaling/PDSCH so it can decode the data directed to the first UE). And in general for the examples above the first and the second UEs are operating in a same cell simultaneously.

The various blocks shown in FIG. 3 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 4:
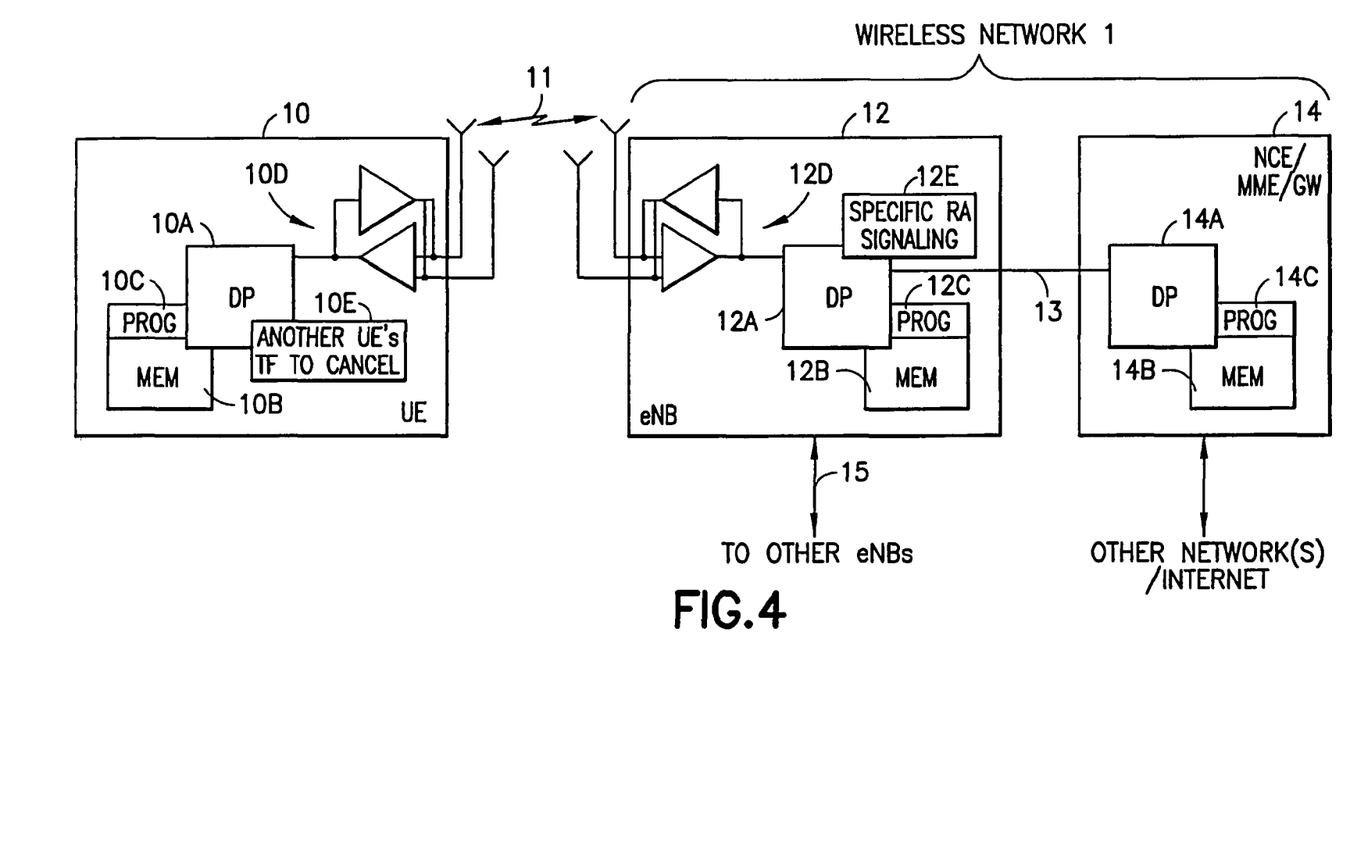
FIG. 4 shows a simplified block diagram of various electronic devices that are suitable for use in practicing the exemplary embodiments of this invention.

Reference is now made to FIG. 4 for illustrating a simplified block diagram of various electronic devices and apparatus that are suitable for use in practicing the exemplary embodiments of this invention, assuming as the above examples do a modified LTE-type system. In FIG. 4 a wireless network 1 is adapted for communication over a wireless link 11 via a network access node such as base station or more specifically an eNB 12, with an apparatus such as a mobile communication device or terminal which may be referred to as a UE 10 or a strong mode user/first UE operating in a first transmission mode. The network 1 may include a network control element (NCE) 14 that may include mobility management entity (MME) and also serving gateway functionality (S-GW) as is known for the LTE and LTE-A systems, and which also provides connectivity with a further network such as a publicly switched telephone network and/or a data communications network (e.g., the internet).

The UE 10 includes a controller, such as a computer or a digital data processor (DP) 10A, a computer-readable memory medium embodied as a memory (MEM) 10B that stores a program of computer instructions (PROG) 10C, and a suitable radio frequency (RF) transceiver 10D (transmitter and receiver, which may be implemented as a unitary component or separate) for bidirectional wireless communications with the eNB 12 via one or more antennas. Two antennas are shown at FIG. 4 but it is understood other embodiments may have one or more than two transmit and/or receive antennas.

The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D (transmitter and receiver combined or separate) for communication with the UE 10 via one or more antennas (two shown at FIG. 4; typically the eNB 12 will have an antenna array). The eNB 12 is coupled via a data / control path 13 to the NCE 14. The path 13 may be implemented as the S1 interface known in the LTE/LTE-A systems. The eNB 12 may also be coupled to another eNB via data/control path 15, which may be implemented as the X2 interface known in the LTE/LTE-A systems.

At least one of the PROGs 10C and 12C is assumed to include program instructions that, when executed by the associated DP, enable the device to operate in accordance with the exemplary embodiments of this invention as are detailed above.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a block 10E a memory which stores the transport format of the second UE/weak mode UE and the algorithm for implementing it to recognize the special resource allocation and cancel the transmissions directed to that second UE as is detailed particularly above by non-limiting examples. The eNB 12 may include a similar program/algorithm for preparing and sending the special resource allocation (RA) signaling as is detailed above by example. These may be implemented in the respective DPs 10A, 12A, or in other hardware or software within the respective devices 10, 12.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Various modifications and adaptations to the foregoing exemplary embodiments of this invention may become apparent to those skilled in the relevant arts in view of the foregoing description, when read in conjunction with the accompanying drawings. For example, rather than generic data sent on a commonly allocated PDSCH these teachings may be specifically implemented for unicast data sent from the eNB to both the first/strong mode UE 10 and to the second/weak mode UE. This and all such modifications of the above examples still fall within the scope of the non-limiting and exemplary embodiments of this invention.

While the exemplary embodiments have been described above in the context of the LTE-A system, it should be appreciated that the exemplary embodiments of this invention are not limited for use with only this one particular type of wireless communication system, and that they may be used to advantage in other wireless communication systems and radio access technologies.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
receiving at a first user equipment an identifier assigned to a second user equipment, wherein the first and the second user equipment operate in a same cell simultaneously;
receiving and decoding at the first user equipment a downlink control channel corresponding to the second user equipment by using the identifier assigned to the second user equipment;
determining from the decoded downlink control channel that the second user equipment is operating in a second transmission mode and is allocated a same radio resource as the first user equipment operating in a first transmission mode, wherein the transmission mode of the second user equipment is implicitly indicated by or in the downlink control indication format of the second user equipment;
determining from the decoded downlink control channel a transport format for transmissions to the second user equipment;
using the determined transport format to decode a transmission received on the radio resource at the first user equipment which is directed to the second user equipment; and
canceling the decoded transmission to mitigate interference with a further transmission directed to the first user equipment based on whether the second user equipment is operating in a second transmission mode.

2. The method according to claim 1, in which specific resource allocation signaling is used to determine that the second user equipment is operating in the second transmission mode and is allocated the same radio resource as the first user equipment.

3. The method according to claim 2 in which the specific resource allocation signaling comprises a resource allocation which allocates the same radio resource to at least the second user equipment.

4. The method according to claim 3, in which the first user equipment decodes the specific resource allocation using a cell radio network temporary identifier C-RNTI assigned to the second user equipment.

5. The method according to claim 2, in which the specific resource allocation signaling comprises a resource allocation directed to the first user equipment that includes an explicit indication that the second user equipment is operating in the second mode.

6. The method according to claim 1, in which the transport format for transmissions to the second user equipment is determined from signaling received from a network access node.

7. The method according to claim 6, in which the signaling received from the network access node indicates the transport format for transmissions to the second user equipment as at least one of:
- modulation constellation;
- forward error control rate;
- modulation and coding scheme; and
- hybrid automatic repeat response redundancy version and new data indicator.

8. The method according to claim 1, the method further comprising:
- receiving an indication of at least one precoder used in the transmissions that are directed to the second user equipment; wherein decoding the transmissions received at the first user equipment further uses the at least one precoder.

9. The method according to claim 1, wherein the method is executed by the first user equipment.

10. An apparatus comprising
- at least one processor and at least one memory including computer program code wherein the at least one memory and the computer program code are configured, with the at least one processor, to cause the apparatus at least to perform the following:
- receiving at a first user equipment an identifier assigned to a second user equipment, wherein the first and the second user equipment operate in a same cell simultaneously;
- receiving and decoding at the first user equipment a downlink control channel corresponding to the second user equipment by using the identifier assigned to the second user equipment;
- determining from the decoded downlink control channel that the second user equipment is operating in a second transmission mode and is allocated a same radio resource as the first user equipment operating in a first transmission mode, wherein the transmission mode of the second user equipment is implicitly indicated by or in the downlink control indication format of the second user equipment;
- determining from the decoded downlink control channel a transport format for transmissions to the second user equipment;
- using the determined transport format to decode a transmission received on the radio resource at the first user equipment which is directed to the second user equipment; and
- canceling the decoded transmission to mitigate interference with a further transmission directed to the first user equipment based on whether the second user equipment is operating in a second transmission mode.

11. The apparatus according to claim 10, in which specific resource allocation signaling is used to determine that the second user equipment is operating in the second transmission mode and is allocated the same radio resource as the first user equipment.

12. The apparatus according to claim 11 in which the specific resource allocation signaling comprises a resource allocation which allocates the same radio resource to at least the second user equipment, and wherein the at least one memory and the computer code are further configured, with the at least one processor, to cause the apparatus to at least perform the following: decoding the specific resource allocation using a cell radio network temporary identifier C-RNTI assigned to the second user equipment.

13. The apparatus according to claim 11, in which the specific resource allocation signaling comprises a resource allocation directed to the first user equipment that includes an explicit indication that the second user equipment is operating in the second mode.

14. The apparatus according to claim 10, wherein the at least one memory and the computer code are further configured, with the at least one processor, to cause the apparatus to at least perform the following: determining the transport format for transmissions to the second user equipment from signaling received from a network access node.

15. The apparatus according to claim 14, in which the signaling received from the network access node indicates the transport format for transmissions to the second user equipment as at least one of:
- modulation constellation;
- forward error control rate;
- modulation and coding scheme; and
- hybrid automatic repeat response redundancy version.

16. The apparatus according to claim 10, wherein the at least one memory and the computer program code are further configured, with the at least one processor, to at least perform the following:
- receiving an indication of at least one precoder used in the transmissions that are directed to the second user equipment; wherein the transmissions received at the first user equipment are decoded using the at least one precoder.

17. The apparatus according to claim 10, wherein the apparatus comprises the first user equipment.

18. A computer product embodied on a non-transitory computer readable memory tangibly storing a program of instructions that, when being executed by a computer, is configured to provide instructions to control or carry out:
- receiving at a first user equipment an identifier assigned to a second user equipment, wherein the first and the second user equipment operate in a same cell simultaneously;
- receiving and decoding at the first user equipment a downlink control channel corresponding to the second user equipment by using the identifier assigned to the second user equipment;
- determining from the decoded downlink control channel that the second user equipment is operating in a second transmission mode and is allocated a same radio resource as the first user equipment operating in a first transmission mode, wherein the transmission mode of the second user equipment is implicitly indicated by or in the downlink control indication format of the second user equipment;
- determining from the decoded downlink control channel a transport format for transmissions to the second user equipment;
- using the determined transport format to decode a transmission received on the radio resource at the first user equipment which is directed to the second user equipment; and
- canceling the decoded transmission to mitigate interference with a further transmission directed to the first user equipment based on whether the second user equipment is operating in a second transmission mode.

* * * * *